United States Patent [19]
Jones

[11] Patent Number: 5,351,557
[45] Date of Patent: Oct. 4, 1994

[54] ROTARY FLOWMETER WITH VARYING AREA CHANNEL

[75] Inventor: Thomas C. Jones, Columbia, Md.

[73] Assignee: Ohmeda Inc., Liberty Corner, N.J.

[21] Appl. No.: 907,495

[22] Filed: Jul. 1, 1992

[51] Int. Cl.⁵ .............................................. G01F 1/28
[52] U.S. Cl. ................................. 73/861.53; 73/861.76
[58] Field of Search .......... 73/861.53, 861.58, 861.71, 73/861.74, 861.75, 861.76

[56] References Cited

U.S. PATENT DOCUMENTS

| | | | |
|---|---|---|---|
| 2,091,792 | 8/1937 | Niesemann | 73/861.54 |
| 2,268,391 | 12/1941 | Guuthier | 73/861.76 |
| 2,355,694 | 8/1944 | Ardedt | 73/861.76 |
| 2,939,319 | 6/1960 | Machlansiti | 73/861.76 |
| 4,713,972 | 12/1987 | Stockburger | 73/861.53 |

*Primary Examiner*—Herbert Goldstein
*Attorney, Agent, or Firm*—Roger M. Rathbun; Larry R. Cassett

[57] ABSTRACT

A rotary type of flowmeter having an orifice directing the flow toward a moveable needle. The needle moves within a channel that has a varying cross-sectional area in a plane transverse to the needle movement such that the effect of the velocity of the fluid impinging on the needle to cause its movement is controlled.

7 Claims, 4 Drawing Sheets

ROTARY FLOWMETER WITH VARYING AREA CHANNEL

BACKGROUND OF THE INVENTION

This invention relates to a rotary flowmeter used to measure the flow of a fluid and, more particularly, to a flowmeter that has a moveable needle that moves within a channel having a varying area.

There are of course, various means of measuring and indicating the flow of a fluid. One such means involves a circular guage having a moveable needle. The flow to be measured is directed towards one end of the moveable needle through an orifice and the fluid impinging against the needle causes it to rotate. A scale is provided that radially surrounds the needle and the needle position can be read from the scale in units of flow. Typical of such flowmeters is shown in Gauthier, U.S. Pat. No. 2,268,391. Actual movement of the needle is caused by drag force on the needle and which tends to move the needle in the direction of flow of the fluid. A return spring is provided to return the needle to its zero position when the flow of fluid has ceased and to provide a counter force opposite the drag force exerted on the needle by the flow of fluid.

A difficulty with such flowmeters relates to their principle of operation. The velocity of the fluid that exits the orifice to impinge on the moveable needle is generally linear with increasing flow, however, the drag force that moves the needle increases with the square of the velocity of the fluid that impinges on that needle. Thus, as the velocity of the fluid impinging on the needle increases, indicating increasing flow, the needle moves angularly further for the same incremental increase in flow rate, and, as a result the scale is generally expanded at the high flows and compressed at the lower flows. That is, the scale indicia are not linearly arranged radially around the needle since needle movement becomes more progressed per unit flow as that flow increases.

There are many applications where an expanded scale at higher flows is undesirable since in many instances, for the total scale movement, greater accuracy may be desired at lower flows, therefore greater scale spacing is advantageous at the lower flows. Alternatively, there are instances where the overall scale is desired to be linear so that each increasing increment of flow would result in the same incremental angular movement of the needle no matter whether the overall flow is low or high.

SUMMARY OF THE INVENTION

The present flowmeter is of the type described above in which a needle, preferably a rotary needle, is moved by means of drag induced upon the end of the needle by the fluid to be measured directed within the flowmeter by an orifice.

With the present invention, however, the needle moves along a channel that varies in cross-section in a plane transverse to the movement of the needle. Thus the clearance between the needle and its surroundings changes and by controlling that change in channel area, the effect of the velocity of the fluid impinging upon the needle can also be controlled.

As an example, in one embodiment, a channel is formed in the face of the flowmeter that increases in depth into the face as the needle moves away from the orifice. The needle paddle, at the needle end, is surrounded by the channel and as the depth of the channel increases, the paddle is in slower flow fluid than if the clearance between the paddle and the channel stayed at its initial dimensions. Since the fluid flow passing through the plane transverse to the needle movement is distributed, at high flows, over a larger area than at low flows, the effect of velocity of the fluid on the paddle at the high flows is reduced and thus the scale can be deliberately affected. In a rotary flowmeter where the fluid to be measured swirls within a circular motion within the meter past the needle, centrifugal force forms a fluid channel with average velocities higher along the outside of such channel, ignoring boundary layer effects. If the channel is properly graded in depth, the scale of the flowmeter can be made linear, that is with uniform gradations, from minimum to maximum flows.

These and other objects, features and advantages of the present invention will be more readily apparent from the detailed description of the preferred embodiments set forth below taken in conjunction with the accompanying drawings.

DETAILED DESCRIPTION OF THE PREFERRED EMBODIMENT

Figure 1:
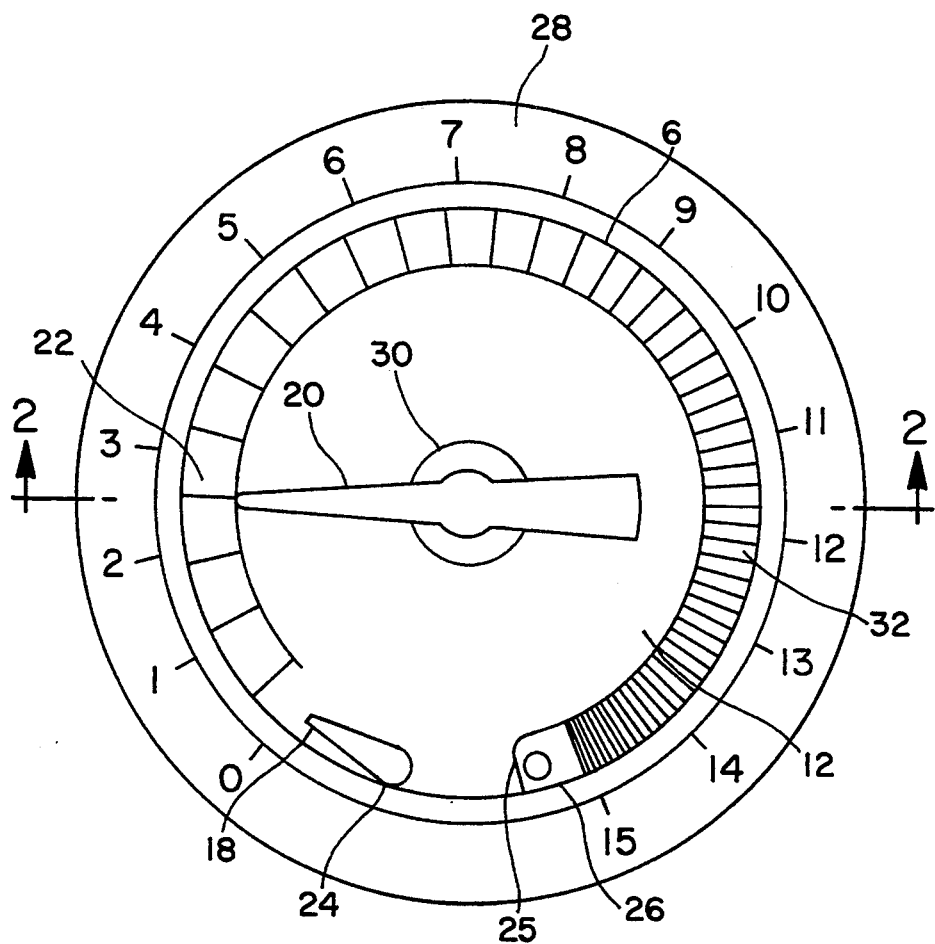
FIG. 1 is a schematic view of a flowmeter constructed in accordance with the present invention.
Figure 2:
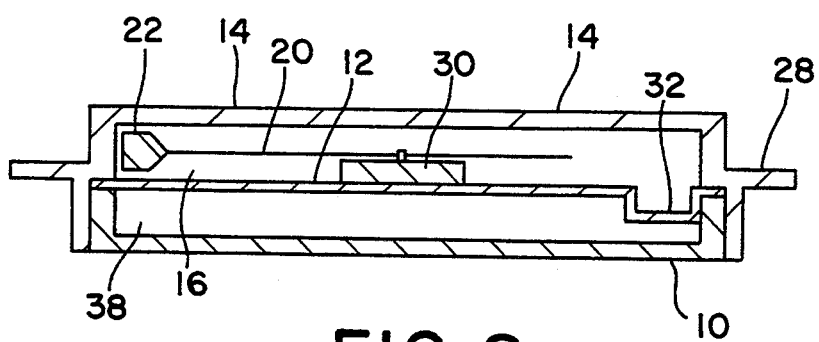
FIG. 2 is a cross-sectional view of the FIG. 1 flowmeter taken along the lines of A—A of FIG. 1.

Turning first to FIGS. 1 and 2 there is shown a schematic view of a flowmeter constructed in accordance with the present invention. The flowmeter includes a casing 10 having a backplate 12 affixed thereto and covered by a clear cover 14.

A metering chamber 16 is thus formed between the backplate 12 and clear cover 14 within which the fluid to be metered is allowed to flow. That fluid enters metering chamber 16 by means of an orifice 18 that directs the fluid generally in a circular pattern within metering chamber 16. An indicating needle 20 is pivoted at or near the center of metering chamber 16 and has, at one end thereof, a paddle 22 that is positioned to be within the circular pattern of the flow of fluid within metering chamber 16.

An inlet 24 provides the fluid to orifice 18 and an outlet 26 allows fluid to exit the metering chamber 16. Surrounding the outer periphery of the metering chamber 16 is a graphic scale 28 having numbers or other indicia so that a user can read the position of the indicating needle 20.

As can readily be seen in FIG. 1 with the indicating needle 20 in its position as shown, the fluid from inlet 24 passes through orifice 18 and impinges directly upon paddle 22 of indicating needle 20, thus causing the indicating needle 20 to rotate in accordance with the velocity of that fluid. The indicating needle 20 thus rotates and as its movement continues, a return spring 30 provides a return force against angular movement of indicating needle 20 opposite the force exerted by impingement of the fluid upon paddle 22.

The operation of the FIG. 1 flowmeter can now be generally explained. The flow to be measured enters the flowmeter through inlet 24 where it then passes through orifice 18 thereby entering metering chamber 16. Orifice 18 serves to form the flow into a jet and which creates a circular pattern of moving fluid generally following the outside wall of metering chamber 16. The jet of fluid from orifice 18 impinges upon the paddle 22 of indicating needle 22 to cause a drag on paddle 22 tending to rotate indicating needle 20 away from the fixed orifice 18 in a clockwise motion as shown in the FIG. 1 embodiment. The force indicated on paddle 22 is opposed by return spring 30 and the indicating needle 20 comes to rest when the force exerted by the fluid is in equilibrium with the return force exerted by return spring 30.

At that point, the graphic scale 28 can be read by the user by noting the indicia or number aligned with the paddle 22 at the end of indicating needle 20 and the flow measured.

As can be seen in the FIG. 1 embodiment, however, a channel 32 is formed in backplate 12 and which channel 32 partially surrounds the paddle 22. The depth of channel 32 increases as the indicating needle 20 rotates in the clockwise direction, that is, as the flow increases, the depth of channel 32 also increases. Thus, as will be explained, the area of the channel 32 within the plane transverse to the needle movement, that is, the plane in which paddle 22 is located at any instant in time, continues to increase in area as flow increases. Since, obviously the area of the paddle 22 stays constant, that paddle 22 moves clockwise with increasing flow in an increasing area through which the fluid passes acting upon indicating needle 20, thus the effect of the velocity of that fluid on indicator needle 20 is decreased. By predetermining the depth of channel 32, therefore, the effect of the velocity of the fluid acting on indicating needle 20 can also be controlled and accordingly, the graphic scale 28 may be tailored to fit various parameters of the particular flow being monitored.

Figure 3:
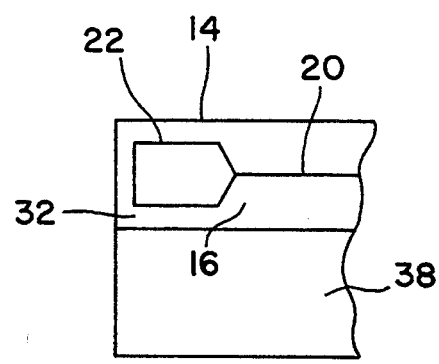
FIGS. 3 and 3A are cutaway schematic views of two positions of the needle of the FIG. 1 flowmeter.
Figure 3A:
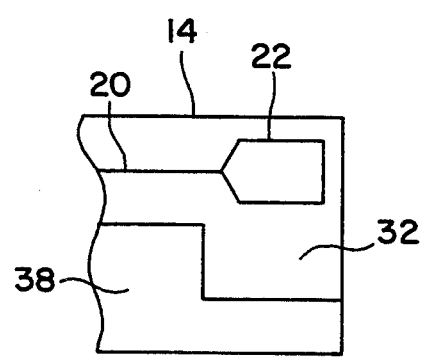

Turning now to FIGS. 3 and 3A, there is shown enlarged schematic views of the indicating needle 20 and paddle 22 in a relatively low flow indicating position of FIG. 3 and a high flow indicating position in FIG. 3A. As can be seen in FIG. 3, at low flows, the area within channel 32 confining the paddle 22 is limited and thus the velocity of the flow of fluid through the plane surrounding and transverse to the movement of paddle 22 has a great effect upon the paddle 22. In FIGS. 3A, however, the channel 32 has now increased in depth and the area of the plane in which the paddle 22 is positioned, is now much greater than that area of FIG. 3, thus the velocity effect that acts upon the paddle 22 causing rotation of indicating needle 20 is reduced. Thus the amount of rotation of indicating needle 20 with changing flows can be controlled by changing the total area that the fluid occupies in acting upon the paddle 22 with respect to the area of the paddle 22 itself.

The effect of the velocity of the fluid on paddle 22 is controlled by changing the proportion of the constant area of the paddle to the area of the channel within which the paddle 22 moves. As channel 32 increases in area, the velocity effect on the paddle 22 itself is reduced.

As shown in FIG's 1 & 2, the paddle 22 moves in a arcuate path, that is radially about a point, and the plane surrounding the paddle 22 is transverse or perpendicular to a tangent line along the arc of a circle at the point where paddle 22 is positioned. If the paddle 22 were moveable along a straight line, the transverse plane surrounding the paddle 22 would, of course, be at a right angle to that straight line.

Figure 4:
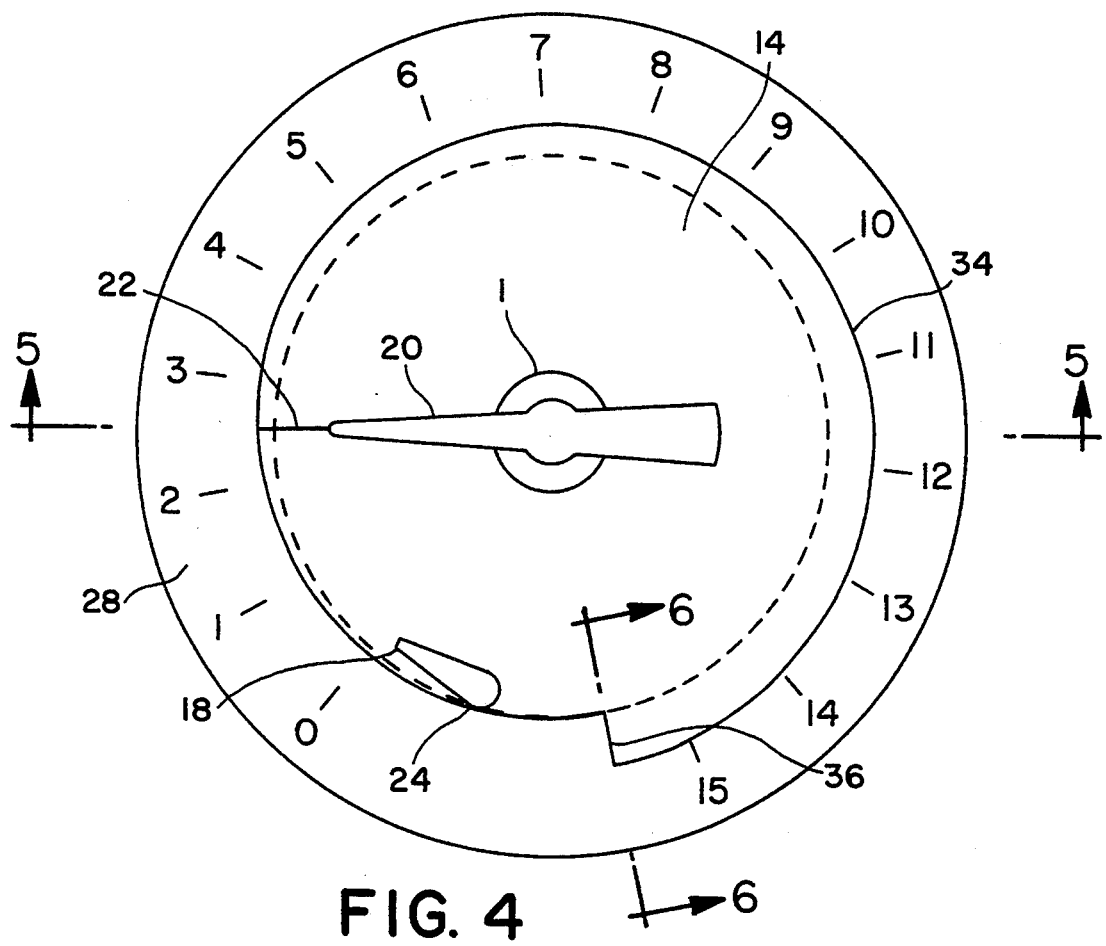
FIG. 4 is a schematic view of an alternate embodiment of the flowmeter constructed in accordance with the present invention.
Figure 5:
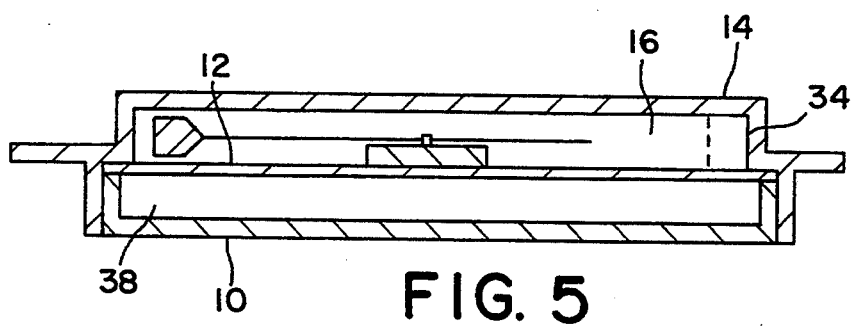
FIG. 5 is a cross-sectional view of the FIG. 4 embodiment taken along the lines A—A of FIG. 4.

Turning now to FIG's 4–6 there are shown schematic views and cross-sectional views of an alternate embodiment of the subject invention. In FIG. 4, it can be seen that the inner wall 34 of clear cover 14 increases in radius in the clockwise direction or as flow increases. Accordingly, as the flow increases, the area within the plane transverse to the needle movement also increases. Again, therefore, the effect of the velocity of the fluid impinging on the indicating needle 20 is less since the paddle 22 occupies a relatively smaller space within the channel of the fluid passing by paddle 22.

Figure 6:
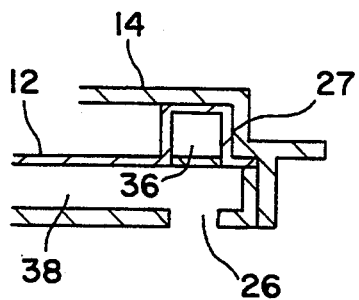
FIG. 6 is a further cross-sectional view of the FIG. 3 embodiment taken along the lines B—B of FIG. 4.

In the FIG. 4 embodiment, particularly shown in FIG. 6, the outlet 26 is formed in the casing 10 and the fluid therefore exits from the metering chamber 16 at the end of its full passageway within metering chamber 16, that is, at the far rotation of indicating needle 20 and passes downward through an opening 36 into an outlet chamber 38 formed beneath backplate 12 to eventually pass through outlet 26. As such, the path of the fluid essentially takes one pass through metering chamber 16 before leaving the flowmeter via outlet 26.

Figure 7:
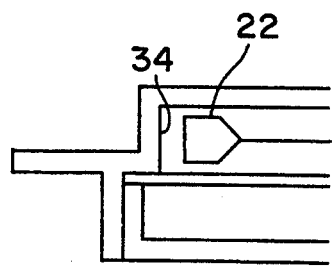
FIGS. 7 and 7A are cutaway enlarged schematic views of two positions of the needle of the FIG. 3 embodiment.
Figure 7A:
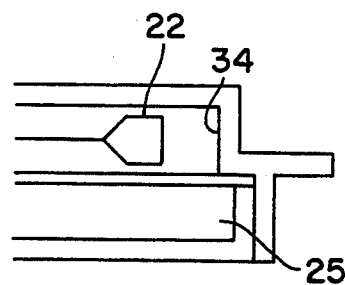

FIGS. 7 and 7A show cutaway enlarged schematic views of the FIG. 3 embodiment showing paddle 22 in its low flow indicating position of FIG. 6 and a higher flow indicating position of FIG. 7A. The difference in areas surrounding the paddle 22 is readily seen and thus the effect of the velocity of the fluid is controlled.

Figure 8:
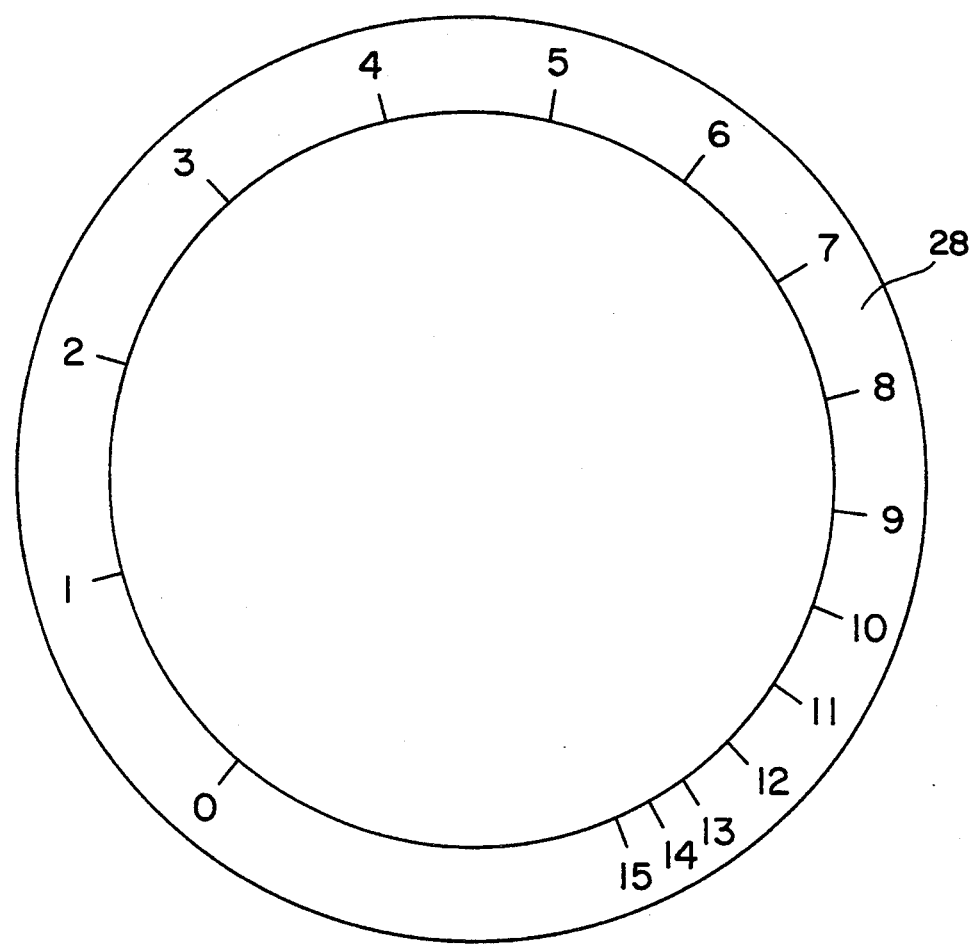
FIG. 8 is a schematic view of a scale that can be used with the flowmeter of the present invention.

Finally, FIG. 8 is a schematic of but one variety of a graphic scale 28 that may be used surrounding the indicating needle (not shown) of a flowmeter constructed in accordance with the present invention. In particular, by selectively choosing the amount of change in the area within the plane transverse to the needle movement, different scales can be used to accurately reflect the particular flow being measured to obtain the most meaningful information from the flowmeter.

Having set forth the invention in what is considered to be the best embodiment thereof, it will be understood that changes may be made in the flowmeter as above set forth without departing from the spirit of the invention or exceeding the scope thereof as defined in the following claims:

We claim:

1. A flowmeter for indicating the flow of fluid, said flowmeter comprising a housing, said housing having a clear cover and a backplate forming a metering chamber therebetween, a channel formed in said backplate, and a moveable needle affixed to said housing and positioned within said metering chamber intermediate said clear cover and said backplate and moving within said channel, a paddle located on said needle, said paddle located at least partially within said channel, an orifice means affixed to said housing and positioned to direct the flow of the fluid into said metering chamber along said channel toward and impinging upon said paddle whereupon said needle moves in relationship to the effect of the velocity of the fluid impinging against said needle, said channel having a varying cross-section area in a plane transverse to the needle movement to vary the effect of the fluid velocity impinging on said needle.

2. A flowmeter as defined in claim 1 wherein the needle moves further away from said orifice as flow increases and said cross-sectional area of said channel gradually increases around said paddle in the direction away from said orifice.

3. A flowmeter as defined in claim 2 wherein said channel spirals radially outwardly from said paddle.

4. A flowmeter for measuring the flow of a fluid, said flowmeter comprising
   a casing;
   a backplate affixed to said casing and forming an outlet chamber therebetween;
   a transparent cover surrounding said backplate and forming a metering chamber therebetween;
   a needle pivotably mounted to said casing and enclosed within said metering chamber;
   a channel formed in said backplate, said channel at least partially enclosing said needle;
   said casing having an inlet and an outlet and an orifice affixed to said casing positioned to receive fluid from said inlet and direct said fluid in a circular pattern within said channel, said fluid thereafter passing from said casing through said outlet;
   said channel having a varying cross-sectional area to control the effect of the fluid velocity in the movement of said needle.

5. A flowmeter as defined in claim 4 wherein the cross-sectional area of said channel increases as said needle moves further away from said orifice.

6. A flowmeter as defined in claim 5 wherein said backplate has indicia thereon to indicate the position of said needle.

7. A flowmeter as defined in claim 5 wherein said channel generally increases in depth in said backplate to vary said cross-sectional area.

* * * * *